United States Patent [19]

Bos

[11] 4,137,175
[45] Jan. 30, 1979

[54] METHOD AND MEANS FOR FILTERING LIQUIDS

[75] Inventor: John A. Bos, Garden City, Mich.

[73] Assignee: Amsted Industries Incorporated, Chicago, Ill.

[21] Appl. No.: 881,379

[22] Filed: Feb. 27, 1978

[51] Int. Cl.² ............................................. B01D 35/00
[52] U.S. Cl. ..................................... 210/351; 60/464; 91/6; 100/269 R
[58] Field of Search ............. 100/269 R; 60/565, 582, 60/464; 91/6, 28, 29; 210/70, 66, 67, 77, 79, 350, 351, 100, 224

[56] References Cited

U.S. PATENT DOCUMENTS

| 2,931,290 | 4/1960 | Davidson | 210/350 |
| 4,022,096 | 5/1977 | Forichon | 100/269 R |

*Primary Examiner*—Frank Sever
*Attorney, Agent, or Firm*—John L. Schmitt; Fred P. Kostka

[57] ABSTRACT

A filter device wherein inlet and outlet chambers are spaced from each other by a segment of filter media is positively locked in a condition whereat the chambers are sealed with respect to each other and the atmosphere by a hydraulic power device to which hydraulic pressure fluid is delivered at a predetermined pressure value. Filtrate is then delivered to the inlet chamber at a pressure which increases in value as the filter media becomes fouled with particulate.

1 Claim, 3 Drawing Figures

METHOD AND MEANS FOR FILTERING LIQUIDS

This invention relates to a method and means for filtering liquids and more particularly to a well-known type of filter device wherein a segment of filter media in a cavity divides the cavity into inlet and outlet chambers spaced from each other by the segment. The liquid to be filtered may be introduced either continuously or in batches. In the latter case, flow through the filter media is obtained by applying air pressure to the inlet chamber.

When the media segment becomes sufficiently resistant to a flow of a filtrate as is caused by solids accumulating on the media surface in the inlet chamber, filtering is terminated and the cavity is opened so that the segment of filter media may be replaced by a clean segment thereof.

A primary object of the invention is to devise a novel positive locking means for maintaining the cavity in sealed condition during the filtrate flow. By using a positive locking means, the filter time cycle may be lengthened since higher internal back pressures are permissible.

Another object of the invention is to use a trapped noncompressible hydraulic fluid in a novel hydraulic circuit to afford such positive locking.

Still another object of the invention is to provide booster means in such a circuit for supplying hydraulic fluid to prevent release of the positive locking which could occur by leaking losses of the hydraulic fluid.

The foregoing and other objects and advantages of the invention will become apparent from a consideration of the following specifications and the accompanying drawings wherein.

Figure 1:
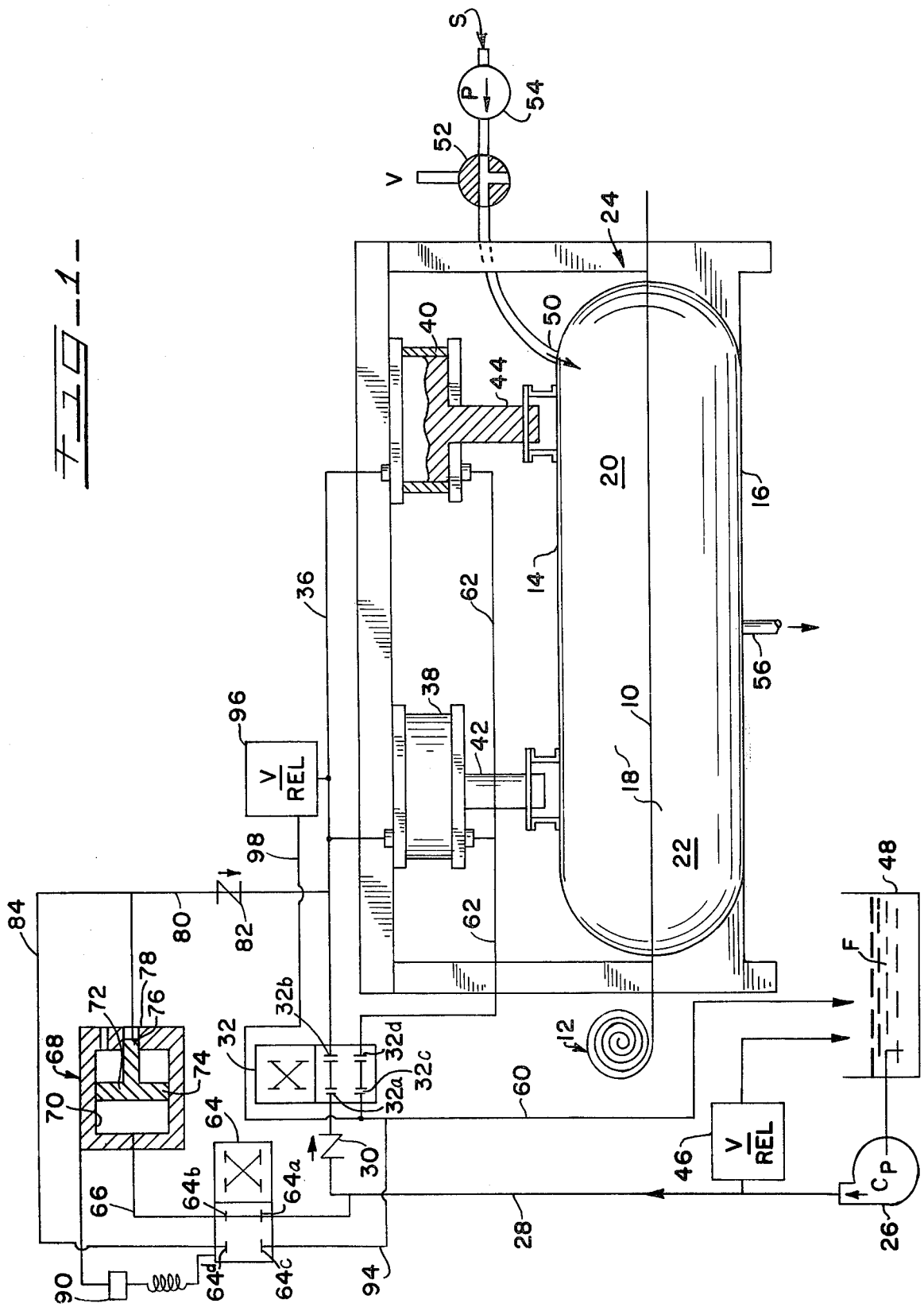
FIG. 1 is a schematic view of a filter device embodying a preferred form of the invention.

Referring to FIG. 1, the invention will be described in connection with a typical cycle.

A segment 10 of filter media 12 is clamped between a movable upper shell portion 14 and a fixed lower shell portion 16 to form a releasable liquid cavity 18 so that the segment 10 of the filter media 12 divides the cavity 18 into an upper inlet chamber 20 and a lower outlet chamber 22. The lower shell portion 16 is carried by a rigid framework 24.

The clamping of the shell portions 14, 16 is accomplished by a main pump 26 which delivers a hydraulic fluid F through a main supply line 28 and a first check valve 30 connected to a first four-way valve 32 having two sets of ports 32a, 32b and 32c, 32d. The valve 32 is so conditioned at this point in the cycle that the hydraulic fluid F from the main pump 26 flows through the ports 32a, 32b into an advance line 36 which in turn connects in parallel hydraulic cylinders 38 and 40 having rams 42 and 44 respectively which divide the cylinders 38, 40 into an advance portion and a return portion. The fluid F causes the rams 42, 44 of the cylinders 38, 40 to move downwardly so as to compress the segment 10 of the filter media 12 between shell portions 14, 16. The fluid F in the main line 28 and in the advance portion of the cylinders 38, 40 as measured proximates 20 psi, as an example.

A pressure relief valve 46 is connected between the main pump 26 and the check valve 30 to prevent overloading of the main pump 26 and to afford pump cooling at conditions of low flow and no flow in the main line 28. During such periods of nonflow, the main pump 26 continues to operate by pumping the hydraulic fluid F through the relief valve 46 and into a reservoir 48 which likewise provides a source of hydraulic fluid F to the main pump 26.

A liquid filtrate enters the inlet chamber 20 through an appropriate inlet 50 which connects with a three-way valve 52, a filtrate pump 54 and a source S of the liquid filtrate. The filtrate flows through the segment 10 of the filter media 12, into the outlet chamber 22 and then from the cavity 18 by a convenient outlet 56 in the outlet chamber 22. During such flow, particulate in the filtrate is collected on the segment 10 of the filter media 12 causing a gradual increase in back pressure on the filtrate pump 54. This filtrate back pressure gradually rises to a pressure value, as an example, in the order of 100 psi within the inlet chamber 20.

This increase in pressure in the inlet chamber 20 causes a like increase in pressure in the advance portion of the cylinders 38, 40 such that the pressure in the advance line 36 increases to a value, for example, in the order of 1,000 psi. The upper and lower shell portions 14, 16 remain sealed because the fluid F in the advance line 36 is trapped between the check valve 30 and the cylinders 38, 40.

When the back pressure in the inlet chamber 20 reaches a predetermined value of, as an example, 100 psi, the filtrate pump 54 is de-energized, the three-way valve 52 is activated to shut off the flow of filtrate and connect the inlet chamber 20 to a source of air or to the atmosphere through a vent V to cause filtrate in the cavity 18 to empty.

Once the cavity 18 is empty, the four-way valve 32 is actuated to connect the advance line 36 to the reservoir 48 through the ports 32b, 32c of the first four-way valve 32 by means of a main exhaust line 60. The main supply line 28 is connected to a lift line 62 through the ports 32a, 32d of the first four-way valve 32 connecting in parallel with the return portion of the cylinders 38, 40 respectively. This actuation of the valve 32 causes the rams 42, 44 to lift the upper shell portion 14 from the lower shell portion 16 and allow indexing of the filter media 12. The fluid F in the advance portion of the cylinders 38, 40 is discharged through the advance line 36, ports 36b, 36c of the first four-way valve 32, and the main exhaust line 60 to the reservoir 48.

In the event a small leakage of the fluid F occurs in the system between the cylinders 38, 40 and the check valve 30, as an example, and at a point in time when the pressure in the advance line 36 is sufficiently greater than the pressure in the main line 28, this leakage could result in an inadvertent opening of the shell portion 14, 16.

In anticipation that such leakage will occur, the system may include a fluid make-up system to supply fluid to replace any lost fluid.

This make-up system includes a second four-way valve 64 having two sets of ports 64a, 64b and 64c, 64d. The main line 28 connects through the ports 64a, 64b of the second four-way valve 64 and a booster pump supply line 66 to a booster pump 68.

The booster pump 68 which is diagrammatically shown in FIG. 1 may comprise a cylinder 70 divided into two cylinder portions and containing a unitary piston 72 having a larger diameter portion 74 and a smaller diameter portion 76. By providing an area ratio, for example, of 50 to 1 between piston portions 74, 76, the outlet pressure of the smaller piston portion 76 may be as high as 1,000 psi.

An outlet 78 of the smaller piston portion 76 of the booster pump 68 connects with the advance line 36 through a make-up supply line 80 which contains a second check valve 82. The second check valve 82 allows a flow direction from the booster pump 68 to the advance line 36 and prohibits an opposite flow direction. The make-up system further includes a by-pass line 84 connecting between the port 64d of the second four-way valve and the make-up supply line 80.

The booster pump 68 operates continuously by cycling between a fully advanced position, i.e. the piston 72 has moved to the right so that the smaller piston portion has displaced all fluid in its respective cylinder portion, and a fully retracted position, i.e. the piston 72 has moved fully to the left. The cycle of the booster pump 68 is controlled by a sensing and switching means 90, for example, a limit switch which senses the smaller piston portion 76 in the fully advanced position and another limit switch which senses the larger piston portion 74 in the fully retracted position.

The means 90 is operatively connected to the second four-way valve 64 and actuates the valve 64 to a condition wherein a flow path exists between ports 64a, 64d and 64b, 64c. When the piston 72 reaches the fully advanced position the sensing and switching means 90 actuates the second four-way valve so that the fluid in the main supply line 28 is then diverted through the ports 64a, 64d of the second four-way valve 64 and to the by-pass line 84. Since the pressure of the fluid F on the booster pump side of the second check valve 82 is equal or less than the pressure of the fluid F on the advance line side of the check valve 82, the fluid F drives the piston 72 to the fully retracted position 88. The fluid F in the cylinder portion of the booster pump 68 associated with the larger piston portion is discharged through the line 66, ports 64b, 64c and into a booster pump exhaust line 94 which in turn connects with the main exhaust line 60.

When the piston 72 reaches the fully retracted position 88, the sensing and switching means 90 again activates the second four-way valve 64 to return the valve 64 to a condition as seen in FIG. 1.

To complete the fluid make-up system, a second pressure relief valve 96 and pressure relief valve exhaust line 98 connect the advance line 36 with the main exhaust line 60. The pressure relief valve 96 allows any excessive make-up fluid F from the booster pump to enter the advance line 36 and to be automatically discharged if not required.

Figure 2:
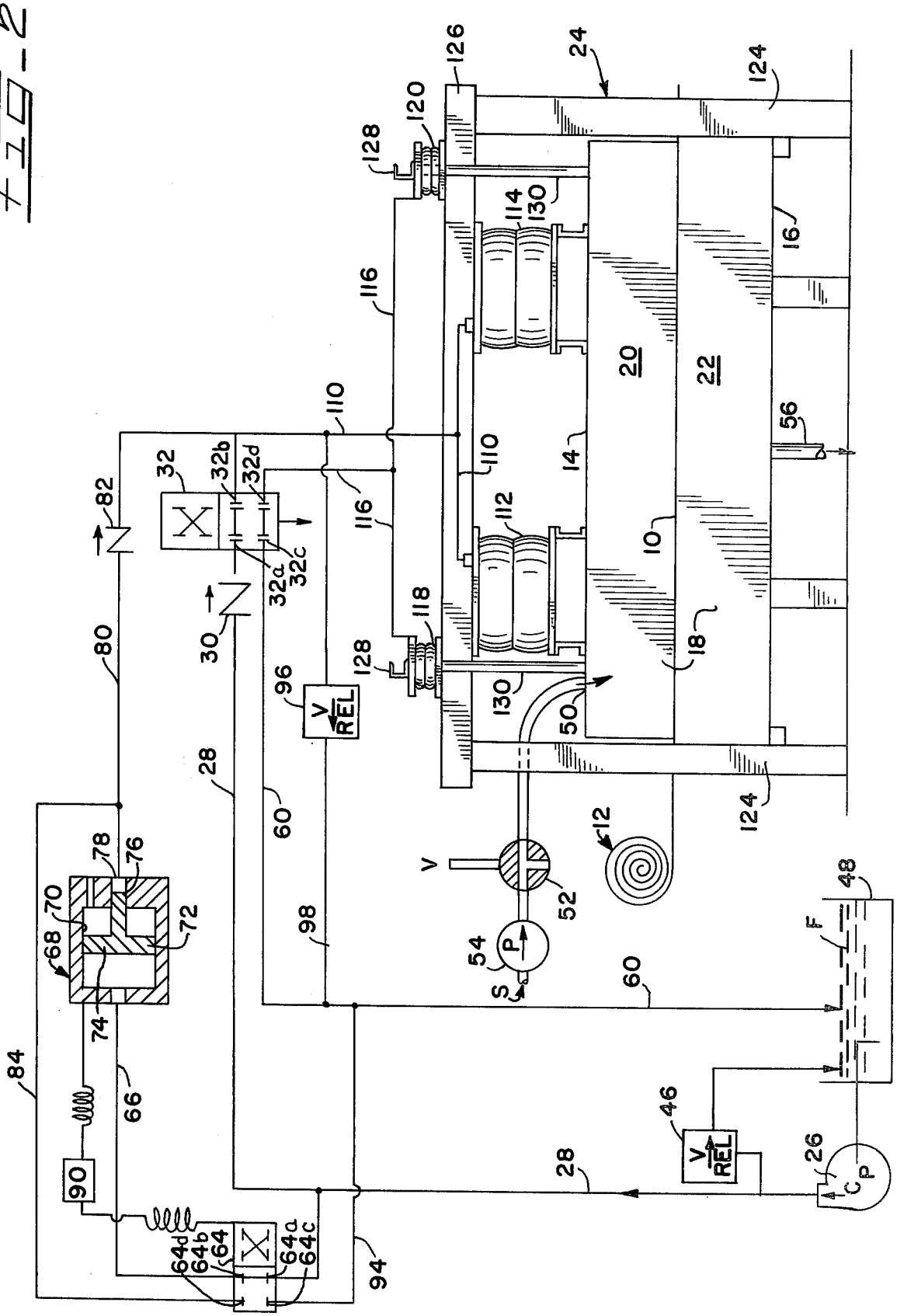
FIG. 2 is a schematic view of a first modification of the invention.

Referring now to FIG. 2, parts corresponding to those of FIG. 1 are identified by corresponding numerals. In the modification of FIG. 2, an advance bag line 110 is connected to a pair of expansible and compressible fluid-tight advance bags 112 and 114, and a lift bag line 116 is connected to another pair of expansible and compressible return or lift bags 118 and 120.

When the advance bags 112 and 114 receive the fluid F from the advance bag line 110 through the four-way valve 32, the lift bags 118 and 120 are exhausted to the reservoir 48 through the lift bag line 116 and the main exhaust line 60 by means of the four-way valve 32. Under these conditions, the upper shell 14 compresses the segment 10 of filter media 12 against the lower shell 16. When it is desired to raise the upper shell 14 to replace the segment 10 of filter media 12, as heretofore described, the first four-way valve 32 is activated so that the advance bag line 110 is exhausted to reservoir 48 through the ports 32b, 32c of the four-way valve 32 which simultaneously connects the main supply line 28 to the lift bag line 116 expanding the lift bags 118 and 120 and compressing the advance bags 112 and 114.

The framework 24 as used with the system of FIG. 2, includes spaced rigid uprights 124 to which the lower shell portion 16 is fixedly attached. A beam 126 is carried between the upper ends of the uprights 124. The beam 126 forms a stationary member against which the advance bags 112, 114 may apply a downward compressing force against the movable upper shell portion 16 and a support for the lift bags 118, 120 allowing such to apply an upward lifting force to cross members 128 which in turn are connected to the movable upper shell portion 14 by vertical members 130.

Figure 3:
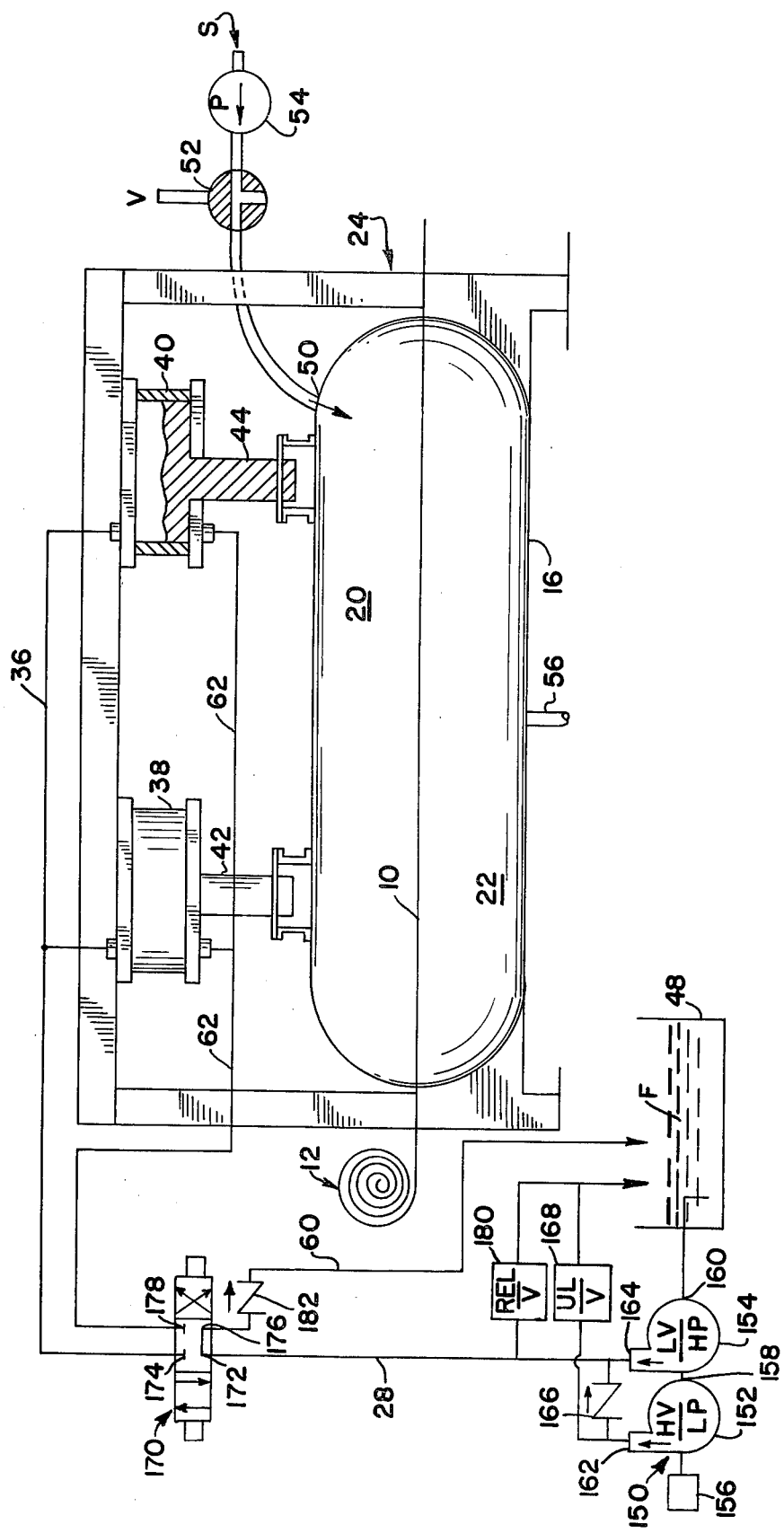
FIG. 3 is a schematic view of a second modification of the invention.

In a third embodiment which is shown in FIG. 3, the system includes a dual rate pump 150 having a high-volume/low-pressure portion 152 and a low-volume/high-pressure portion 154. These pump portions 152, 154 can be connected to a common drive 156. An intake 158, 160 of the pump portion connects with the reservoir 48 for their requirement of the fluid F.

A discharge 162 and 164 of each pump portion 152, 154 connects in parallel with the main supply line 28 with the low pressure portion 152 first discharging through a third check valve 166 which prevents a flow from the high pressure portion 154. Between the check valve 166 and the discharge 162 of the low pressure portion 152 is connected an unloading valve 168 the function of which will be explained subsequently.

The main supply line 28 connects with a third four-way valve 170 through a first port 172 with the remaining ports designated 174, 176 and 178. Between the valve 170 and the high pressure discharge 164 is a high pressure relief valve 180 connected to the supply line 28.

The third four-way valve 170 has a first state which connects the port 172 with the third port 176 which in turn connects with the reservoir 48 through a fourth check valve 182.

The second state of the third four-way valve connects the first port 172 with the second port 174 and connects the third port 176 to the fourth port 178. In this state, fluid F may flow from the pump 150, through the third four-way valve 170, into the advance line 36 and to the advance portion of the hydraulic cylinders 38, 40. Any fluid in the return portion of the cylinders 38, 40 is returned to the reservoir 48 by the return line 62 which connects with the fourth port 178 of the third four-way valve 170.

The third state of the third four-way valve 170 connects the first port 172 with the fourth port 178 and the second port 174 with the third port 176. In this state, the fluid F may flow from the pump 150 into the return line 62 and to the return portion of the hydraulic cylinders 38, 40. Any fluid in the advance portion of the cylinders 38, 40 is returned to the reservoir 48 through the check valve 182.

During operation, immediately after the filter media 12 has been indexed to provide a clean filter segment 10, the third four-way valve 170 is placed in its second state to activate the cylinders 38, 40 to place the upper and lower shell portions 14, 16 in a sealed condition. During this initial sealing period, both portions 152, 154 of the pump 150 deliver the fluid F to the advance portion of the cylinders 38, 40.

Once the shell portions 14, 16 are sealed, the pressure of the fluid F increases quickly to a value exceeding 75 psi, for example, at which the high-volume/low-pressure portion 152 starts discharging through the unloading valve 168 while the low-volume/high-pressure portion 154 continues discharging until the pressure increases to reach a value proximating 1,000 psi. At this point, the fluid F is discharged through the pressure relief valve 180. Note that the check valve 166 prevents a fluid flow from the low-volume/high-pressure portion 154 to the unloading valve 168. Any fluid leakage is immediately made up by the pump portion 154 to prevent an inadvertent unsealing of the shell portions 14, 16.

Once the filter segment has become sufficiently fouled, the third four-way valve may be placed in its first state to minimize the energy input to the motor 156 since the discharge from the pump portion 152, 154 now connects with a near resistant free flow path provided by the ports 172, 176 of the third four-way valve 170 to the reservoir 48.

Once the liquid cavity 18 formed by the shell portion 14, 16 is sufficiently empty, the valve 170 is placed in its third state to activate the return portion of the cylinders 38, 40 to raise and unseal the shell portion 14, 16. Upon completion of the unsealing, the valve 170 is returned to its first state to prevent any unnecessary pressure build up in the return line 62 and thus an unnecessary use of energy.

While various modifications may be suggested by those versed in the art, it should be understood that I wish to embody within the scope of the patent warranted hereon, all such modifications as reasonably and properly come within the scope of my contribution to the art.

What is claimed is:

1. In a filtering system for removing particulate from a filtrate flow wherein said flow enters a filter cavity defined by a fixed lower portion and a movable upper portion and a filter media selectively sealed between said filter portions by an operative device connected to said upper filter portion and having an advance portion and a lift portion, the improvement comprising, a pumping means divided into a first high-volume/low-pressure portion and a second low-volume/high-pressure portion, said portions having intakes connected to a supply of fluid in a reservoir, check valve means allowing a flow between an inlet side and an outlet side and preventing an opposite flow, said inlet side connected to a discharge of said first pump portion and said outlet side connected to a discharge of said second pump portion, an unload device to provide a flow path upon said device sensing a selective first pressure of said fluid, said device having an inlet connected between said inlet side of said first check valve means and said discharge of said first pumping portion, and an outlet connected to said reservoir, a four-way valving means having a first, second, third and fourth port, said means having a first state providing a flow path between said first and third ports, a second state providing a flow path between said first and second ports and a flow path between said third and fourth ports, and a third state providing a flow path between said first and fourth ports and a flow path between said second and third ports, said first port connected to said outlet side of said check valve means and to said discharge of said second pump portion, said second port connected to said advance portion of said operative device, said third port connected to said reservoir, and said fourth port connected to said lift portion of said operative device, and pressure relief means to provide a flow path upon said means sensing a selective second pressure having a value substantially greater than said first pressure, said means having an inlet connected between said first port of said valving means, said discharge of said second pump portion and said outlet side of said check valve means, and an outlet connected to said reservoir, wherein said valving means may be selectively regulated to place filter cavity in a sealed or an unsealed condition or said pumping means in a low energy consuming state.

* * * * *